May 13, 1930. H. L. JOYCE 1,758,403
INDICATING GAUGE FOR LIQUIDS
Filed May 13, 1925   3 Sheets-Sheet 1
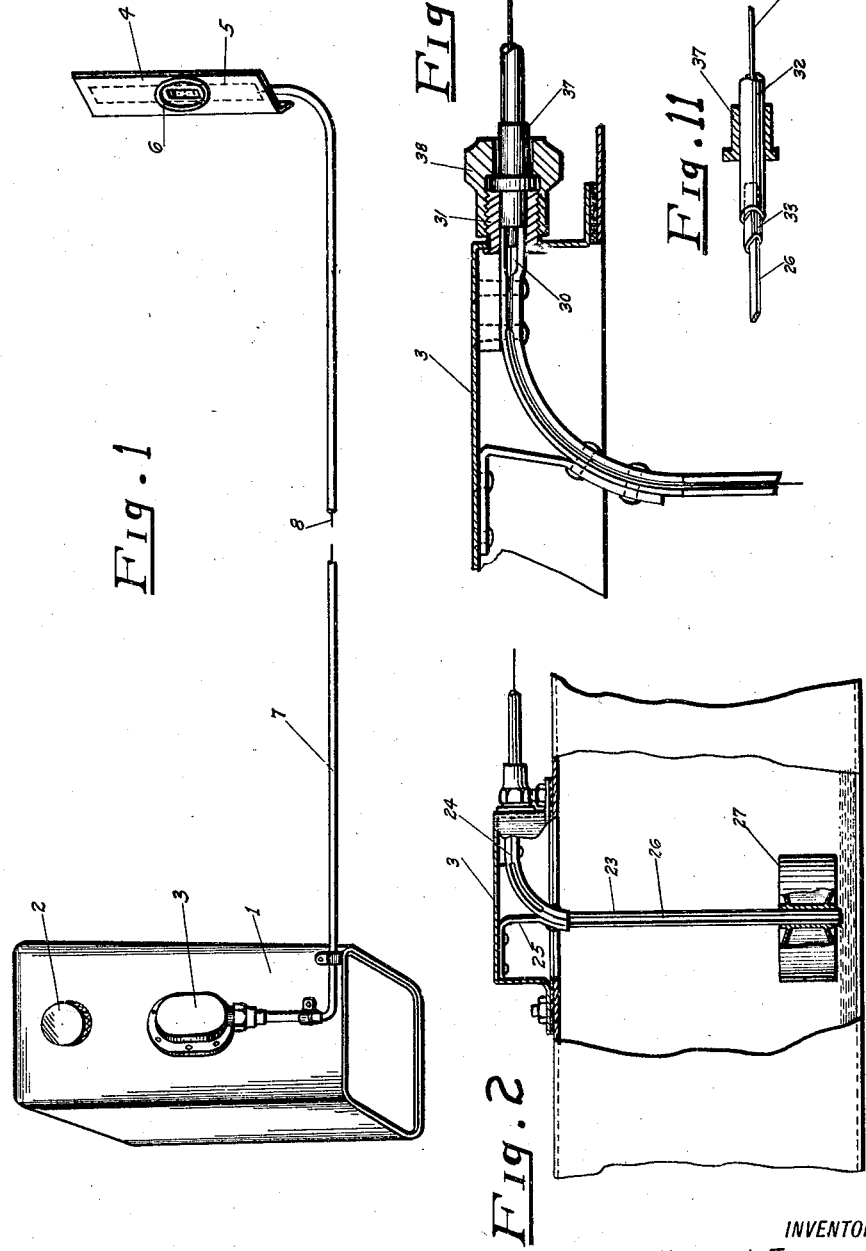
INVENTOR
HAROLD L. JOYCE
BY
ATTORNEY May 13, 1930. H. L. JOYCE 1,758,403
INDICATING GAUGE FOR LIQUIDS
Filed May 13, 1925 3 Sheets-Sheet 2

INVENTOR
HAROLD L. JOYCE
BY
A. D. T. Libby
ATTORNEY

May 13, 1930. H. L. JOYCE 1,758,403
INDICATING GAUGE FOR LIQUIDS
Filed May 13, 1925   3 Sheets-Sheet 3
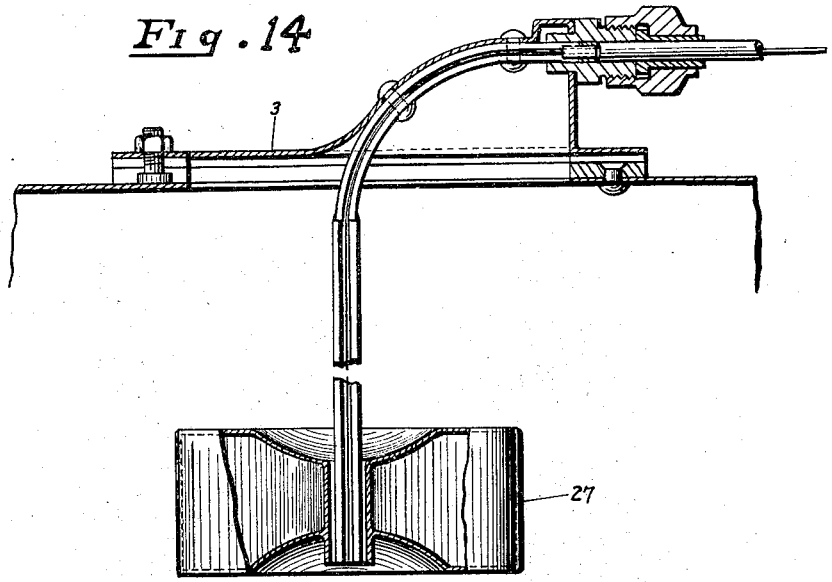
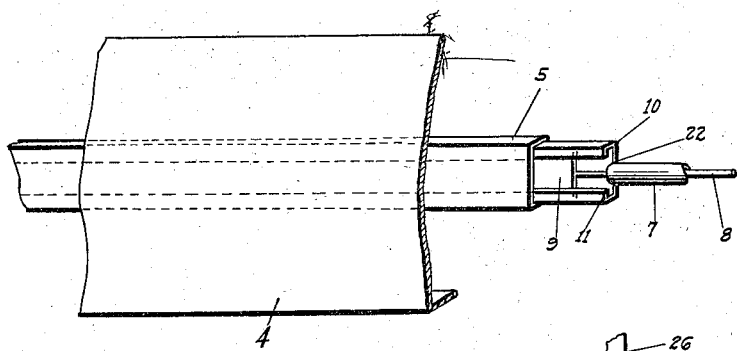
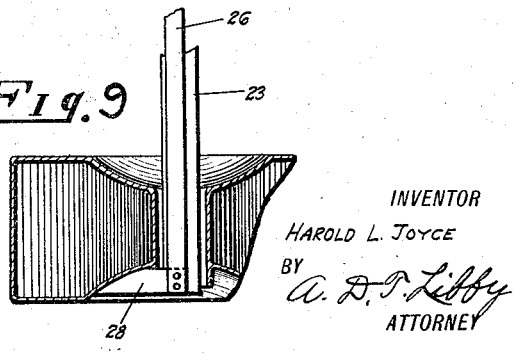
INVENTOR
HAROLD L. JOYCE
BY
ATTORNEY Patented May 13, 1930

1,758,403

UNITED STATES PATENT OFFICE.

HAROLD L. JOYCE, OF SOUTH ORANGE, NEW JERSEY, ASSIGNOR TO THE TIFFANY MANUFACTURING CO., OF NEWARK, NEW JERSEY

INDICATING GAUGE FOR LIQUIDS

Application filed May 13, 1925. Serial No. 30,132.

This invention relates to means for indicating the amount of liquid in a vessel, or tank.

In order to illustrate my invention, I have chosen to show its application to an automotive vehicle for indicating the amount of fuel in the gasoline supply tank.

An indicating device, or gauge, to accurately register the amount of gasolene in the supply tank of an automotive vehicle, must stand a tremendous amount of abuse, and, consequently, must be of a design which will stand rough treatment.

It is, therefore, the principal object of my invention to provide an indicating gauge that will correctly register the amount of liquid in the supply vessel at all times, and one that will register accurately when installed in an automotive vehicle subjected to all the vibrations usual to such vehicles.

A further object of my invention is to provide an indicating gauge which is direct acting, that is to say, one in which the indicator, or, gauge proper is operated direct from the float member in the tank or vessel without any intermediate motion changing devices.

A still further object of my invention is to provide an indicating gauge which is not subject to changes in temperature and which does not rely on air tight connections for its operation.

A still further object of my invention is to provide an indicating scale which is relatively simple to install, as well as being cheap to manufacture.

These and other objects will be apparent from a study of the specification taken in connection with the annexed drawings wherein, Figure 1 is a diagrammatic view of my arrangement showing the indicator or scale mounted apart from the supply vessel.

Figure 2 is a part sectional view showing the tank mechanism.

Figure 3 is a view of the upper part of Fig. 2 on a somewhat enlarged scale.

Figure 9 is a part sectional view through the tank float.

Figure 10 is a perspective view on an enlarged scale of part of the devices shown in section in Fig. 5.

Figure 11 is a view of a detail of the cap mechanism shown in Fig. 3.

Figure 14 is a modified form of the tank cap.

Figure 5:
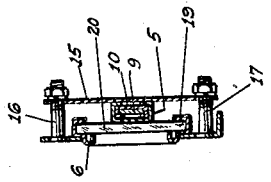
Figure 5 is a section on the line 5—5 of Fig. 4.
Figure 4:
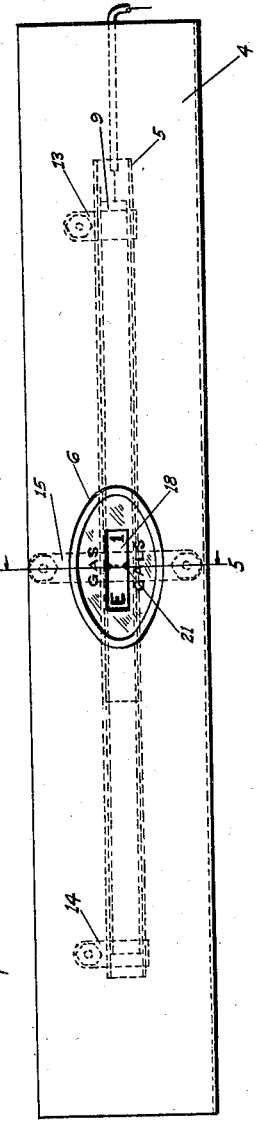
Figure 4 is a view of the scale or indicator proper mounted on suitable mounting such as the dash of an automotive vehicle.

Referring now to the details wherein like numbers refer to corresponding parts in the various views, 1 is a vessel or tank having a filler plug 2, and a special cap 3; 4 is a portion of any suitable mounting, such as the dash on an automotive vehicle, behind which is mounted a scale guide holder 5. An indicator case having a bezel 6 projects through the part 4, as will be later explained more in detail. Extending between the part 4 and the tank 1 is a protecting pipe 7, within which is carried a flexible metallic member 8, connected at one end in any satisfactory manner to a sliding scale or indicator 9. I prefer to use for the sliding scale indicator 9, a metal tape which is suitably calibrated as will be hereinafter pointed out. The scale tape indicator 9 is carried in a scale guide 10 which is preferably in the form of a rectangular tube having the front side open for a considerable portion of the width as indicated in Figure 10; two edges 11 being used to hold the tape within the rectangular shaped opening in the member 10. The scale guide 10 is carried by a scale guide holder 5, preferably made similar to the member 10. The holder 5 is fastened to the support or dash 4 by a pair of end brackets or clamps 13 and 14, and a centrally disposed clamp 15 which is carried by the studs 16 and 17 suitably attached to the member 4. The holder 5 is provided with a central opening 18, through which the scale 9 may be seen, and an indicator casing 19 having a bezel 6 which projects through the member 4. The member 19 carries a glass 20, through which indications on the scale 9 are read. If desired, an index plate having points 21 may be used as shown in Fig. 4. The protecting pipe 7 is attached to the scale guide 10 at 22 in any satisfactory manner, and preferably both ends of the scale guide 10 are closed up to keep out as much dust as possible. It will be noted from Figs. 4 and 5, that by means of the clamps 13 and 14, and the central clamp 15, the scale guide 10, together with the scale 9, may be held in adjusted position longitudinally with respect to the holder 5 for a purpose which will be later pointed out.

Figure 6:
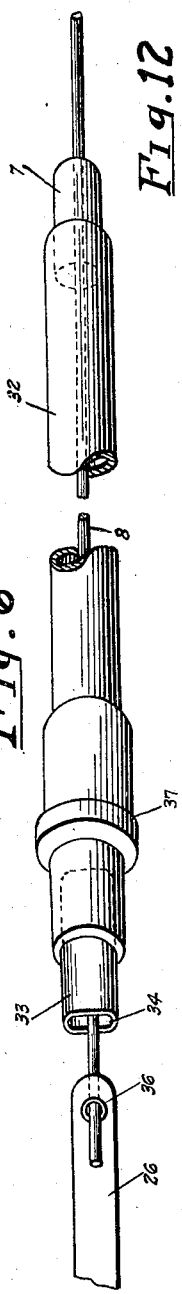
Figure 6 is an enlarged view of the connecting mechanism at the tank or vessel end.
Figures 12, 13:
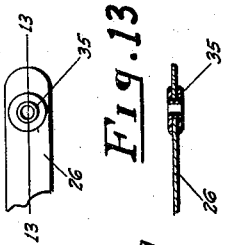
Figure 12 is a plan view of the end of the float tape.
Figure 13 is a section on the line 13—13 of Fig. 12.
Figure 8:
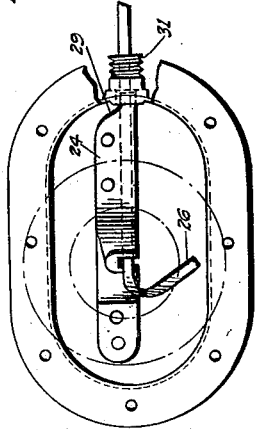
Figure 8 is a bottom view of the tank cap shown in Fig. 3 with the float guide stem removed.
Figure 7:
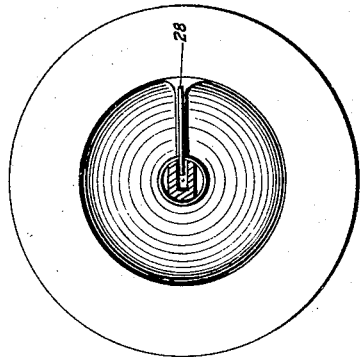
Figure 7 is a bottom view of the float shown in Fig. 2.

The cap 3 is fastened to the tank 1 in any satisfactory manner. Attached to the inner wall of the cap 3 is a guide stem 23 which is supported on the cap 3 by an arm 24, and a brace 25. The stem 23 is preferably rectangular in shape and has a rectangular shaped slot opening on one side. Positioned and guided in this slot is a float tape 26 preferably of suitable metal for the purpose. The lower end of the tape is attached to a float 27 by means of a support piece 28, fastened to the bottom of the float in any suitable manner as by soldering. The end of the arm 24 is narrowed down at 29 (see Fig. 8) and terminates in a throat 30 which projects a short distance into the nipple 31 that is suitably fastened to the cap 3. The protecting pipe 7 preferably terminates at the tank end in a tube support 32, the pipe 7 entering the tube 32 only a short distance and being fastened thereto as by soldering. The other end of the tube 32 is fitted with an end 33 which may take the form of a tube extending substantially the full length of the outer tube 32, or only a short distance as indicated in Fig. 6. In either case, the end 34 is formed somewhat oval in shape to fit the throat 30 of the arm 24. This arrangement is to provide a suitable guide for the float tape 26, it being understood that the inner pipe 33 is of sufficient size to give free movement of the tape 26. The connecting member 8 from the indicator, per se, is joined to the float tape 26 in any satisfactory manner, one such connection being shown in Figs. 6, 12, and 13, in which figures the member 26 is shown equipped with a suitable eyelet 35 which may be used in order to prevent any cutting action due to the union 36 shown in Fig. 6. The union 36, as shown in Fig. 6, is formed by passing the member 8 on the back side of the float tape 26 through the eyelet 35 and then bent to lie closely along the flat surface of the tape 26. The tube 32 is fastened to the cap 3 by means of a nipple collar 37, which is permanently fastened to the tube 32 and a clamping nut 38 fitting on the nipple 31, as clearly shown in Fig. 3.

In Fig. 14, I have shown a modified form of cap 3, which is somewhat simpler in construction than the cap shown in Fig. 1. The other details, however, are the same as has been described.

For the member 8, I prefer to use a small round wire of suitable material which is flattened, giving a section somewhat oval in shape, similar to the end 34 of the pipe 33 shown in Fig. 6. I find by using this construction, the wire will lie flat in the tube and can be operated on a curve easier than a round wire, for it will be understood that in an automobile installation the protecting pipe 7 must have some bends or turns in it. Furthermore, the oval shaped wire will give stiffness in the direction desired as well as flexibility in the desired direction, and altogether I prefer to use this rather than a round wire, or a tape similar to that used to connect the wire to the float as has been described, as a flattened wire will not buckle, the same as a round wire or piece of metal tape. From what has been said, it will be observed that the action between the float 27 and the scale 9 is a direct one, that is to say, the indicator 9 moves directly according to the movement of the float 27, and therefore, the indicator will read directly in gallons or fractions thereof according to the calibrations desired on the scale—the number of gallons or parts thereof in the vessel or tank. As previously noted, the scale guide 10 is adjustable with respect to the holder 5, so that if, for example, one gallon of fuel be poured into the tank 1, the scale guide and the scale would be shifted in the holder 5 until the indicator registers 1, at the indicator fingers 21, after which the clamps 13, 14, and 15 are drawn up so as to clamp the scale guide in the holder, but, still allowing the indicator to be moved freely in the guide. After a given tank has been calibrated on the scale for the number of gallons which has been poured into the tank, any quantity of scales may be then made from the sample, and on installation the indicator or scale may be set so that E, or Empty, is in line with the indicating fingers 21, after which the addition of the fuel in the tank will be correctly registered by the scale.

It is evident that the construction herein described gives a direct reading instrument, there being no lost motion through the use of levers or loose joints, and the design is such that little friction is encountered in the complete installation.

The arm 24, and the stem 23, are so shaped as to produce minimum friction to the movement of the tape 26 which is suitably guided within the stem and arm to keep it in proper working position; consequently, the float has but very little load to carry and its movement, indicated by the readings of the scale, will register with great accuracy the amount of fuel in the tank.

It may be mentioned in passing that, with respect to Fig. 6, the tape 26 has been withdrawn from the pipes 32 and 33, in order to show the union 36. It is to be understood that in normal operation the union 36 is within the protecting tube or tubes which are long enough to provide for the full range of movement of the float 27 and the scale 9. It is also to be understood that the scale 9 may be graduated to read in fractions of the tank capacity, that is to say, ¼, ½, or ¾ full.

It will be clearly apparent that numerous changes in the details entering into my invention can be made, and that the invention may be applied to various purposes, other than the specific application which has been described, merely, for the purpose of illustration.

Having thus described my invention what I claim is:

1. In a gauge for liquids, a slidable scale indicator, a guide for the indicator, a guide holder adjustable with respect to the indicator guide, means for holding the guide and holder in adjusted position, a float for mounting in a vessel containing a liquid and means having stiffness and flexibility connecting the float and the indicator.

2. Means for indicating the amount of liquid in a vessel comprising; a slidable scale indicator adapted to be mounted apart from said vessel, a cap fastened to said vessel, a guide stem supported by the cap, a float tape positioned within said stem, a float attached to said float tape, and guided in its up and down movement by said stem, a guide for the indicator, a holder for the guide adjustable with respect to the indicator guide, means for holding the guide and holder in adjusted position, a conduit having an anchorage at one end to said cap and fastened at the other end to said indicator guide and a flexible metallic member extending through the conduit and attached to the float tape and the scale indicator.

3. Means for indicating the amount of liquid in a vessel comprising, a slidable scale indicator adapted to be mounted apart from said vessel, a cap fastened to said vessel and having a guide stem extending downward into the vessel, a tape member carried in said stem and adapted to extend from the cap, a float fastened to said tape and guided in its up and down movement by said stem, a guide for the indicator, a protecting conduit extending from the cap to the indicator guide and fastened thereto and a flexible but positive acting metallic member in the conduit connected between the scale indicator and the float tape.

4. Means for indicating the amount of liquid in a vessel comprising; a slidable scale indicator adapted to be mounted apart from said vessel, a cap fastened to said vessel and having a slotted guide stem extending downward into the vessel, said stem having a throat at its upper end, a tape member lying in said slotted stem and adapted to extend from the cap through said throat, a float fastened to said tape and guided in its up and down movement by said stem, a guide for the indicator scale, a protecting conduit terminating at one end in a manner to fit said throat with means for holding this end securely to said cap, the other end of the conduit being fastened to said indicator guide and a flexible but positive acting metallic member in the conduit connected to the scale indicator at one end and to the float tape at the other end.

5. Means for indicating the amount of liquid in a vessel comprising; a slidable scale, a scale guide, a guide holder adjustable with respect to the indicator guide, means for holding the guide and holder in adjusted position, a cap on the vessel, a guide stem carried by the cap, a float guided in its up and down movement by the stem, a conduit attached to the cap and to the guide holder and a direct acting metallic member guided within the conduit and connected to the float and slidable scale.

6. Means for indicating the amount of liquid in a vessel comprising; an index plate and means for mounting the same for visual observation, a guide holder having an opening therein adjacent said index plate, a scale guide carried by said holder and manually adjustable with respect thereto, a calibrated slidable scale carried by said scale guide, a guide stem extending from the top part of said vessel toward the bottom thereof, a float positioned around said stem and guided thereby, a conduit extending from the vessel and fastened to the scale guide, a hollow arm connecting the conduit in the vessel to said stem and a direct acting metallic member guided within the conduit, the hollow arm and stem and connected to the float and slidable scale.

7. Means for indicating the amount of liquid in a vessel comprising; an index plate and means for mounting the same for visual observation, a guide holder having an opening therein adjacent said index plate, a scale guide carried by said holder and manually adjustable with respect thereto, a calibrated slidable scale carried by said scale guide, a cap attached to the vessel, a guide stem carried by the cap and extending downward within the vessel, a float guided in its up and down movement by the stem, a thin flexible metallic member guided by the stem and attached to the float and adapted to extend without the cap, a conduit extending from the cap to and fastened to said scale guide, said conduit having a reinforced end adapted to complete the connection to the cap whereby said thin member carried by said stem may be guided into said conduit, and a direct acting metallic member guided within said conduit and connected at one end to said scale and at the other end to said thin member fastened to the float.

8. Means for indicating directly in gallons or parts thereof the quantity of gasolene in a supply tank, comprising; a slidable scale indicator, a guide for the scale indicator, a holder for the guide adjustable with respect to the indicator guide, a cap on the supply tank, a stem carried by the cap, a float guided in its up and down movement by the stem, a protecting pipe extending from the cap and fastened at its other end to the scale guide, a flexible metallic member within said pipe and having means for attachment to said float and to said scale indicator and means for holding the guide holder in adjusted position with respect to the indicator guide, whereby the scale will indicate the amount of gasoline in the tank.

In testimony whereof, I affix my signature.

HAROLD L. JOYCE.